(12) United States Patent
Shimojou et al.

(10) Patent No.: US 10,652,949 B2
(45) Date of Patent: May 12, 2020

(54) COMMUNICATION CONTROL METHOD AND COMMUNICATION SYSTEM

(71) Applicant: NTT DOCOMO, INC., Tokyo (JP)

(72) Inventors: Takuya Shimojou, Tokyo (JP); Masayoshi Shimizu, Tokyo (JP); Atsushi Minokuchi, Tokyo (JP); Shigeru Iwashina, Tokyo (JP); Srisakul Thakolsri, Munich (DE); Malla Reddy Sama, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,658

(22) PCT Filed: Sep. 20, 2017

(86) PCT No.: PCT/JP2017/033866
§ 371 (c)(1),
(2) Date: Mar. 28, 2019

(87) PCT Pub. No.: WO2018/061920
PCT Pub. Date: Apr. 5, 2018

(65) Prior Publication Data
US 2019/0230734 A1    Jul. 25, 2019

(30) Foreign Application Priority Data

Sep. 30, 2016   (JP) .................................. 2016-193507

(51) Int. Cl.
*H04W 4/00* (2018.01)
*H04W 76/38* (2018.01)
(Continued)

(52) U.S. Cl.
CPC ........... *H04W 76/38* (2018.02); *H04W 72/04* (2013.01); *H04W 92/14* (2013.01)

(58) Field of Classification Search
None
See application file for complete search history.

(56) References Cited

U.S. PATENT DOCUMENTS

2008/0304510 A1* 12/2008 Qu ..................... H04L 67/143
                                                        370/463
2009/0310551 A1* 12/2009 Hellgren ............... H04L 67/14
                                                        370/329
(Continued)

FOREIGN PATENT DOCUMENTS

| JP | 2012-175575 A | 9/2012 |
| JP | 2013-017082 A | 1/2013 |
| WO | 2014/041805 A1 | 3/2014 |

OTHER PUBLICATIONS

Written Opinion of the International Searching Authority issued in PCT/JP2017/033866 dated Dec. 5, 2017 (10 pages).
(Continued)

*Primary Examiner* — Clemence S Han
(74) *Attorney, Agent, or Firm* — Osha Liang LLP

(57) ABSTRACT

In a communication system in which a plurality of bearers are set up between UE and one or more PGWs, a PGW measures an idle time for each bearer and determines whether or not the measured idle time has reached an idle timer threshold value which is determined in advance for each of the plurality of bearers (Step 1). Then, when it is determined that the idle time for one bearer, for example, bearer 2, has reached the idle timer threshold value (Step 2), a PGW2 requests an MME to release bearer 2 via an SGW2 (Steps 3 and 4), and the MME performs a process of releasing bearer 2 in response to the request (Step 5 and the like).

4 Claims, 11 Drawing Sheets

(a)

| E-RAN ID | IDLE TIMER THRESHOLD VALUE |
|---|---|
| xxx | IDLE timer1 |
| yyy | IDLE timer2 |
| : | : |

(b)

| BEARER | IDLE TIMER THRESHOLD VALUE |
|---|---|
| BEARER 1 | IDLE timer1 |
| BEARER 2 | IDLE timer2 |
| : | : |

(c)

| PUD SESSION | IDLE TIMER THRESHOLD VALUE |
|---|---|
| PUD SESSION 1 | IDLE timer1 |
| PUD SESSION 2 | IDLE timer2 |
| : | : |

(51) Int. Cl.
*H04W 72/04* (2009.01)
*H04W 92/14* (2009.01)

(56) References Cited

U.S. PATENT DOCUMENTS

| 2011/0167161 A1* | 7/2011 | Hellgren | H04L 67/14 |
| | | | 709/227 |
| 2015/0180774 A1* | 6/2015 | Loach | H04L 45/74 |
| | | | 370/392 |
| 2015/0237458 A1 | 8/2015 | Zembutsu et al. | |

OTHER PUBLICATIONS

3GPP TR 23.799 V1.0.0; "3rd Generation Partnership Project; Technical Specification Group Services and System Aspects; Study on Architecture for Next Generation System (Release 14)"; Sep. 2016 (423 pages).
International Preliminary Report on Patentability from PCT/JP2017/033866 dated Apr. 4, 2019 (6 pages).

* cited by examiner

| E-RAN ID | IDLE TIMER THRESHOLD VALUE |
|---|---|
| xxx | IDLE timer1 |
| yyy | IDLE timer2 |
| ⋮ | ⋮ |

(b)

| BEARER | IDLE TIMER THRESHOLD VALUE |
|---|---|
| BEARER 1 | IDLE timer1 |
| BEARER 2 | IDLE timer2 |
| ⋮ | ⋮ |

(c)

| PUD SESSION | IDLE TIMER THRESHOLD VALUE |
|---|---|
| PUD SESSION 1 | IDLE timer1 |
| PUD SESSION 2 | IDLE timer2 |
| ⋮ | ⋮ |

COMMUNICATION CONTROL METHOD AND COMMUNICATION SYSTEM

TECHNICAL FIELD

The present invention relates to a communication control method which is performed in a communication system in which a terminal can simultaneously access a plurality of user data packet paths and a communication system.

BACKGROUND ART

In order to use a desired service in a mobile network, a terminal (UE: User Equipment) needs to set up a user data packet path (which is referred to as a bearer (PDN connection), a protocol data unit (PDU) session, or the like) between the UE and a packet data network (PDN) corresponding to the service (see Patent Literature 1).

When a terminal does not use a service, it is not necessary to set up a user data packet path. Accordingly, in a conventional technique, a base station that manages the terminal determines an operation state of the user data packet path by monitoring whether there is a packet which is being transmitted or received through the user data packet path, and the user data packet path is released to an idle state when it is determined that the user data packet path is not operating.

CITATION LIST

Patent Literature

[Patent Literature 1] Japanese Patent Publication No. 2012-175575

SUMMARY OF INVENTION

Technical Problem

Recently, since a case in which a terminal simultaneously uses a plurality of services has been conceived, a technique of allowing a terminal to simultaneously access a plurality of user data packet paths has been proposed.

However, in the conventional technique associated with checking an operation state using the base station, a case in which a terminal simultaneously accesses a plurality of user data packet paths is not considered. Accordingly, when one of a plurality of user data packet paths is operating, that is, when there is a packet which is being transmitted or received through one of a plurality of user data packet paths, there is a problem in that it is determined that all of the plurality of user data packet paths are operating (that is, not in an idle state).

The invention was made to solve the above-mentioned problem and an objective thereof is to appropriately determine an operation state of respective paths and to appropriately perform control associated with release of respective paths even in a case in which a terminal simultaneously accesses a plurality of user data packet paths.

Solution to Problem

According to an aspect of the invention, there is provided a communication control method which is performed in a communication system which includes a terminal, a base station, a processing server that performs a process associated with the terminal, one or more serving gateways, and one or more packet data network gateways and in which a plurality of bearers are set up between the terminal and the one or more packet data network gateways via the base station and the one or more serving gateways, the communication control method including: a step of causing the packet data network gateway to measure an idle time which is a duration time of an idle state of a bearer for each bearer; a step of causing the packet data network gateway to determine whether or not the measured idle time has reached an idle timer threshold value which is determined in advance for each of the plurality of bearers as an idle timer threshold value that is used to determine that a bearer is in an idle state for each bearer; a step of causing the packet data network gateway to request the processing server to release one bearer when it is determined that the idle time for the bearer has reached the idle timer threshold value; and a step of causing the processing server to perform a process of releasing the bearer in response to the request from the packet data network gateway.

In the communication control method, in the communication system in which a plurality of bearers are set up between a terminal and one or more packet data network gateways via a base station and one or more serving gateways, one packet data network gateway measures an idle time for each bearer and determines whether or not the measured idle time has reached an idle timer threshold value which is determined in advance for each of the plurality of bearers for each bearer. When it is determined that the idle time for one bearer has reached the idle timer threshold value, the packet data network gateway requests the processing server to release the one bearer, and the processing server performs a process of releasing the one bearer in response to the request from the packet data network gateway. Accordingly, even in a case in which a terminal simultaneously accesses a plurality of bearers (user data packet paths), it is possible to appropriately determine an operation state of each path and to appropriately perform control associated with release of each path. By causing a packet data network gateway which is located upstream in a network to perform measurement of an idle time, determination of whether or not the idle time has reached an idle timer threshold value, and a request for releasing one bearer when it is determined that the idle time for the one bearer has reached the idle timer threshold value, there is an advantage that it is not necessary to change specifications of a radio access network (RAN).

The invention can also be applied to a so-called next generation network (NGN) and can be described, for example, as follows. According to an aspect of the invention, there is provided a communication control method which is performed in a communication system which includes a terminal, a base station, a processing server that performs a process associated with the terminal, a plurality of control planes that transmit a control signal for a communication service which is used by the terminal, and a plurality of user planes that transmit a user signal for the communication service and in which a PDU session is set up between the terminal and the plurality of user planes via the base station, the communication control method including: a step of causing each user plane to measure an idle time which is a duration time of an idle state of a PDU session set in the user plane; a step of causing each user plane to determine whether or not the measured idle time has reached an idle timer threshold value which is determined in advance to determine that a PDU session set in the user plane is in an idle state; a step of causing one user plane to request the processing server to release a PDU session set in the one user plane when the one user plane determines that the idle time has reached the idle timer threshold value; and a step of causing the processing server to perform a process of releasing the PDU session set in the one user plane in response to the request from the one user plane.

In the communication control method, in the communication system in which a PDU session is set up between a terminal and a plurality of user planes via a base station, each user plane measures an idle time for the PDU session set in the user plane and determines whether or not the measured idle time has reached a predetermined idle timer threshold value. When one user plane determines that the idle time has reached the idle timer threshold value, the one user plane requests the processing server to release the PDU session set in the one user plane, and the processing server performs a process of releasing the PDU session set in the one user plane in response to the request from the one user plane. Accordingly, even in a case in which a terminal simultaneously accesses a plurality of PDU sessions (user data packet paths), it is possible to appropriately determine an operation state of each path and to appropriately perform control associated with release of each path. By causing a user plane which is located upstream in a network to perform measurement of an idle time, determination of whether or not the idle time has reached an idle timer threshold value, and a request for releasing one PDU session when it is determined that the idle time for the one PDU session has reached the idle timer threshold value, there is an advantage that it is not necessary to change specifications of a radio access network (RAN).

Advantageous Effects of Invention

According to the invention, even in a case in which a terminal simultaneously accesses a plurality of user data packet paths, it is possible to appropriately determine an operation state of each path and to appropriately perform control associated with release of each path.

BRIEF DESCRIPTION OF DRAWINGS

FIG. 2(a) is a diagram illustrating an example of a correspondence table associated with an idle timer which is stored in an MME, and FIG. 2(b) and FIG. 2(c) are diagrams illustrating examples of a correspondence table associated with an idle timer which is stored in a PGW.

DESCRIPTION OF EMBODIMENTS

Hereinafter, first to third embodiments of the invention will be described with reference to the accompanying drawings. The first embodiment is an embodiment in which control for releasing one bearer of a plurality of bearers is performed dominantly by a PGW in a state in which the plurality of bearers are set up between a terminal (user equipment (hereinafter referred to as a "UE" in the embodiments of the invention)) and a plurality of different SGWs in an evolved packet core (EPC) network. The second embodiment is an embodiment in which control for releasing one bearer of a plurality of bearers is performed dominantly by a PGW in a state in which the plurality of bearers are set up between UE and a single SGW in an EPC network. The third embodiment is an embodiment in which control for releasing one bearer of a plurality of bearers is performed dominantly by a user plane (hereinafter referred to as a "UP" in the embodiments of the invention) in a state in which a PDU session is set up between UE and a plurality of user planes in a so-called next generation network (NGN). In description with reference to the drawings, the same elements will be referred to by the same reference signs and description thereof will not be repeated.

First Embodiment

As described above, in the first embodiment, an embodiment in which control for releasing one bearer of a plurality of bearers is performed dominantly by a PGW in a state in which the plurality of bearers are set up between UE and a plurality of different SGWs in an EPC network will be described.

(System Configuration of First Embodiment)

Figure 1:
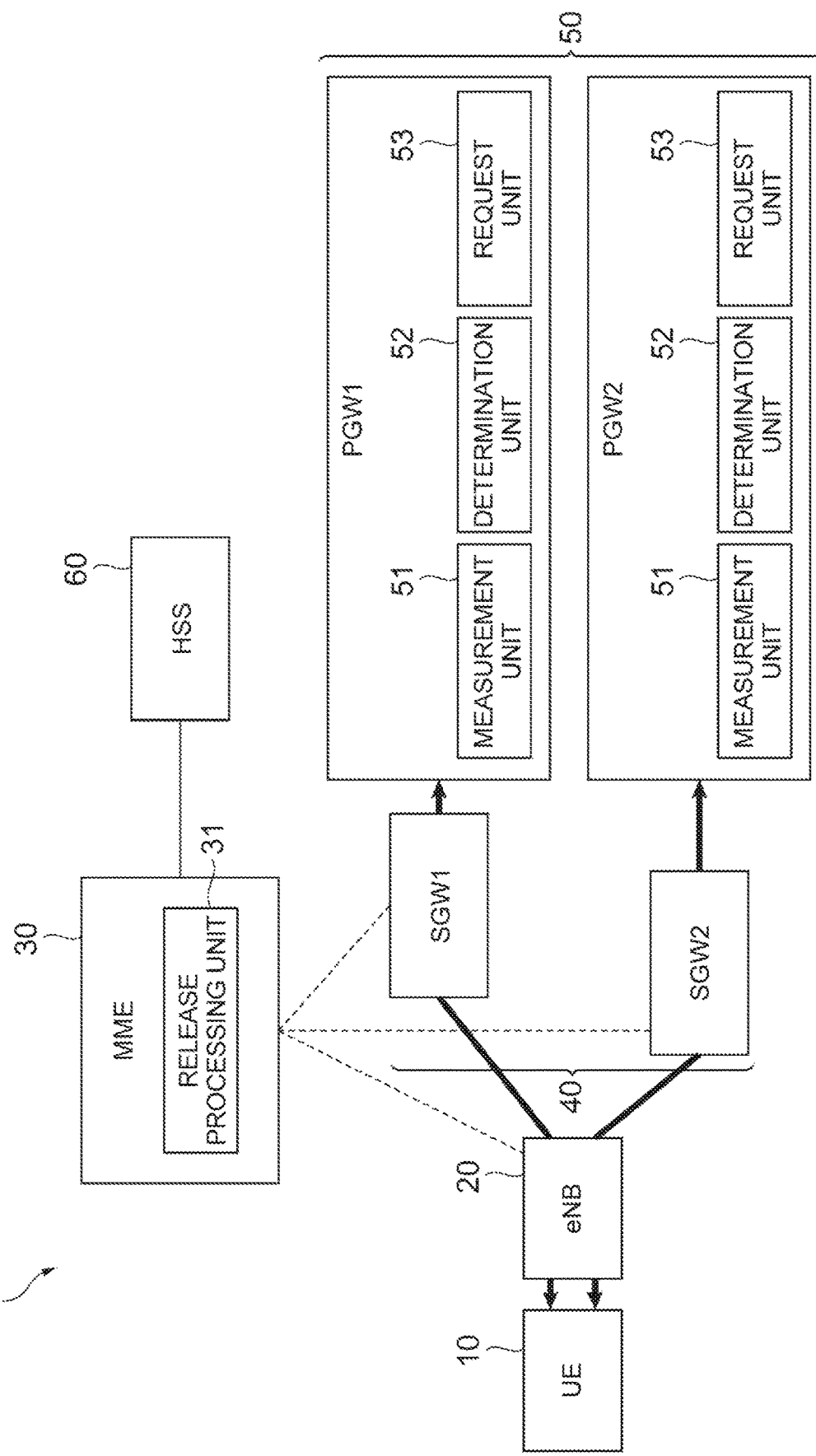
FIG. 1 is a diagram illustrating an example of a configuration of a communication system according to a first embodiment.

As illustrated in FIG. 1, a communication system 1 according to the first embodiment includes a terminal (UE) 10, an eNodeB (hereinafter referred to as "eNB" in the embodiments of the invention) 20 corresponding to a base station, a mobility management entity (MME) 30 that performs processes such as location management, authentication control, and communication path setting of the UE 10 which is located in a network, a home subscriber server (HSS) 60 that manages user information (subscriber information) of a terminal user, a serving gateway (SGW) 40 which will be described later, and a packet data network gateway (PGW) 50 which will be described later and which is located upstream from the SGW 40. Here, a "processing server" in the claims corresponds to the MME 30.

The SGW 40 is a gateway device that performs a function of allowing packet switching accommodating LTE, and one or more SGWs 40 are provided to correspond to requirements of a communication service which is used by the UE 10.

The PGW 50 is a junction with a packet data network (PDN) and is a gateway device that performs allocation of IP addresses, packet transmission to the SGW 40, and the like.

In this embodiment, for example, it is assumed that the SGWs 40 (SGW1 and SGW2 herein) and the PGWs 50 (PGW1 and PGW2 herein) are provided to correspond to requirements of a plurality of communication services which are used by the UE 10.

As functional blocks associated with the invention, the PGW 50 includes a measurement unit 51 that measures an idle time which is a duration time of an idle state of a bearer for each bearer, a determination unit 52 that determines whether or not the idle time measured by the measurement unit 51 has reached an idle timer threshold value which will be described later for each bearer, and a request unit 53 that requests the MME 30 to release one bearer when the determination unit 52 determines that the idle time for the one bearer has reached the idle timer threshold value. The MME 30 includes a release processing unit 31 that performs a process of releasing the one bearer in response to the request from the request unit 53.

The idle timer threshold value (hereinafter also referred to as an "idle timer" in the embodiments of the invention) is an idle timer threshold value which his used to determine that one bearer is in an idle state, and is determined in advance for each of a plurality of bearers on the basis of a service type, a usage type of UE, a subscriber type of a terminal user, and the like by the MME 30 (or a slice management function (SMF) which is not illustrated). The MME 30 stores a correspondence table in which an enterprise radio access network (E-RAN) ID, an enhanced packet system (EPS) ID, a data center network (DCN) ID, and the like is stored in correlation with an idle timer threshold value, and notifies the PGW 50 of the corresponding idle timer threshold value. For example, a correspondence table in which the E-RAN IDs and the idle timer threshold values illustrated in FIG. 2(*a*) are stored in correlation with each other is stored by the MME 30. The determination unit 52 of the PGW 50 stores, for example, a correspondence table in which bearers and the idle timer threshold values illustrated in FIG. 2(*b*) are stored in correlation with each other, and determines whether or not the idle time measured by the measurement unit 51 has reached the idle timer threshold value which will be described later for each bearer as described above.

Now, an example of the hardware configuration of the PGW 50 will be described with reference to FIG. 3. The functional blocks (functional units) of the PGW 50 are realized in an arbitrary combination of hardware and/or software. Means for realizing each functional block is not particularly limited. That is, each functional block may be realized by one device which is physically and/or logically combined or may be realized by two or more devices which are physically and/or logically separate and which are linked to each other in a wired and/or wireless manner. The example of the hardware configuration which will be described below is not limited to the PGW 50 and may be employed by the HSS 60, the SGW 40, the MME 30, the eNB 20, and the UE 10 which are illustrated in FIG. 1.

For example, the PGW 50 in one embodiment of the invention may serve as a computer that performs control for releasing a bearer (a PDU session) associated with the invention. FIG. 3 is a diagram illustrating an example of the hardware configuration of the PGW 50 in one embodiment of the invention. The PGW 50 may be physically configured as a computer device including a processor 50A, a memory 50B, a storage 50C, a communication module 50D, an input device 50E, an output device 50F, and a bus 50G.

In the following description, the term, "device," can be replaced with circuit, device, unit, or the like. The hardware of the PGW 50 may be configured to include one or more devices illustrated in the drawing or may be configured not to include some devices.

The functions of the PGW 50 can be realized by reading predetermined software (program) to the hardware such as the processor 50A and the memory 50B and causing the processor 50A to perform arithmetic operations and to control communication using the communication module 50D and reading and/or writing of data with respect to the memory 50B and the storage 50C.

The processor 50A controls a computer as a whole, for example, by activating an operating system. The processor 50A may be configured as a central processing unit (CPU) including an interface with peripherals, a controller, an arithmetic unit, and a register. For example, the measurement unit 51, the determination unit 52, and the request unit 53 may be realized by the processor 50A.

The processor 50A reads a program (a program code), a software module, and data from the storage 50C and/or the communication module 50D into the memory 50B and performs various processes in accordance therewith. As the program, a program that causes a computer to perform at least a part of the operations described in the above-mentioned embodiment is used. For example, the measurement unit 51, the determination unit 52, and the request unit 53 may be realized by a control program which is stored in the memory 50B and which operates in the processor 50A, or other functional blocks may be realized in the same way. The above-mentioned various processes are performed by the single processor 50A, but may be simultaneously or sequentially performed by two or more processors 50A. The processor 50A may be mounted as one or more chips. The program may be transmitted from a network via an electric telecommunication line.

The memory 50B is a computer-readable recording medium and may include, for example, at least one of a read only memory (ROM), an erasable programmable ROM (EPROM), an electrically erasable programmable ROM (EEPROM), and a random access memory (RAM). The memory 50B may be referred to as a register, a cache, a main memory (a main storage device), or the like. The memory 50B can store a program (a program code), a software module, and the like that can be executed to perform a method according to one embodiment of the invention.

The storage 50C is a computer-readable recording medium and may include, for example, at least one of an optical disc such as a compact disc ROM (CD-ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disc, and a magnetic strip. The storage 50C may be referred to as an auxiliary storage device. The storage mediums may be, for example, a database including the memory 50B and/or the storage 50C, a server, or another appropriate medium.

The communication module 50D is hardware (a transmission and reception device) that performs communication between computers via a wired and/or wireless network and is referred to as, for example, a network device, a network controller, or a network card.

The input device 50E is an input device that receives an input from the outside. The output device 50F is an output device (for example, a display, a speaker, or an LED lamp) that performs an output to the outside. The input device 50E and the output device 50F may be configured as a unified body (for example, a touch panel).

The devices such as the processor 50A and the memory 50B are connected to each other via the bus 50G for communication of information. The bus 50G may include a single bus or may include buses which are different depending on the devices.

The PGW 50 may be configured to include hardware such as a microprocessor, a digital signal processor (DSP), an application specific integrated circuit (ASIC), a programmable logic device (PLD), and a field programmable gate array (FPGA), and a part or all of the functional blocks may be realized by the hardware. For example, the processor 50A may be mounted as at least one piece of the hardware.

(Processing Details of First Embodiment)

Processing details of the first embodiment will be described below with reference to FIGS. 4 and 5.

First, an attachment process in the first embodiment will be described with reference to FIG. 4. When UE transmits an Attach Request for requesting an attachment process to an eNB, the Attach Request is transmitted from the eNB to an MME (Step 1 in FIG. 4). The MME selects the SGW1 and the PGW1 depending on a service type which is used by the UE or the like, acquires idle timer information (idle timer 1) when the UE uses a service associated with bearer 1 from the table of FIG. 2(a) stored in the MME or an SMF which is not illustrated, and transmits a Create Session Request including an E-RAN ID and idle timer 1 to the SGW1 (Step 2 in FIG. 4). Then, the SGW1 transmits the Create Session Request including the E-RAN ID and idle timer 1 to the PGW1 (Step 3 in FIG. 4). Accordingly, the PGW1 acquires the idle timer information (idle timer 1) associated with bearer 1. Then, the PGW1 returns a Create Session Response to the SGW1 (Step 4 in FIG. 4), and the SGW1 returns the Create Session Response to the MME (Step 5 in FIG. 4). When the MME transmits an Initial Context Request including the E-RAN ID to the eNB (Step 6 in FIG. 4), an RRC connection is set up between the UE and the eNB thereafter (Step 7 in FIG. 4) and thus bearer 1 is set up between the UE and the eNB, between the eNB and the SGW1, and between the SGW1 and the PGW1.

Figure 4:
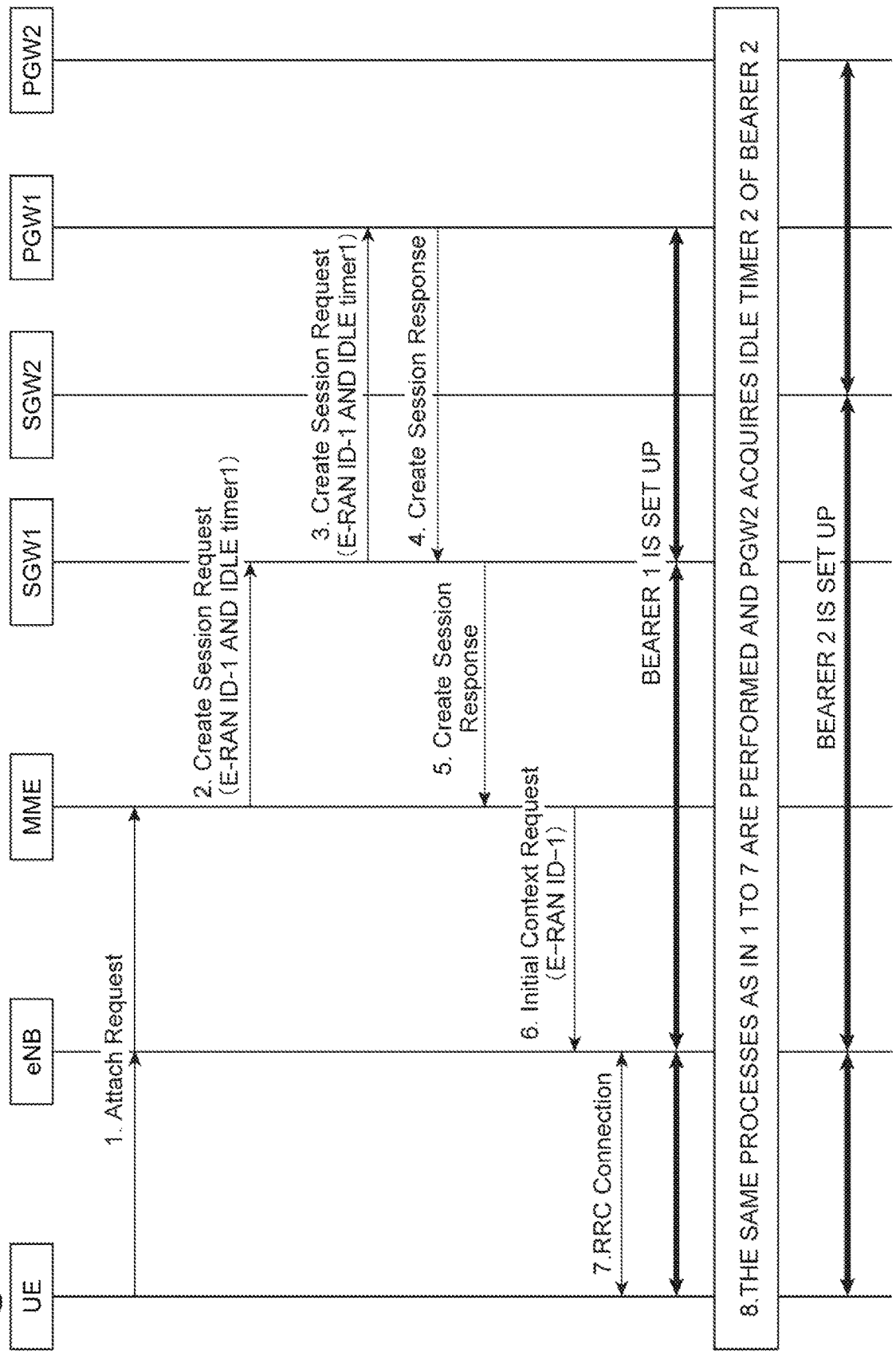
FIG. 4 is a sequence diagram illustrating an attachment process in the first embodiment.

For bearer 2, the same processes as in Steps 1 to 7 in FIG. 4 are performed, the PGW2 acquires idle timer information (idle timer 2) associated with bearer 2 (Step 8 in FIG. 4), and bearer 2 is set up between the UE and the eNB, between the eNB and the SGW2, and between the SGW2 and the PGW2. In Steps 2, 3, and 6, an EPS ID may be used instead of an E-RAN ID.

As described above, bearers 1 and 2 are set up by repeating almost the same bearer setting-up procedure two times.

Figure 5:
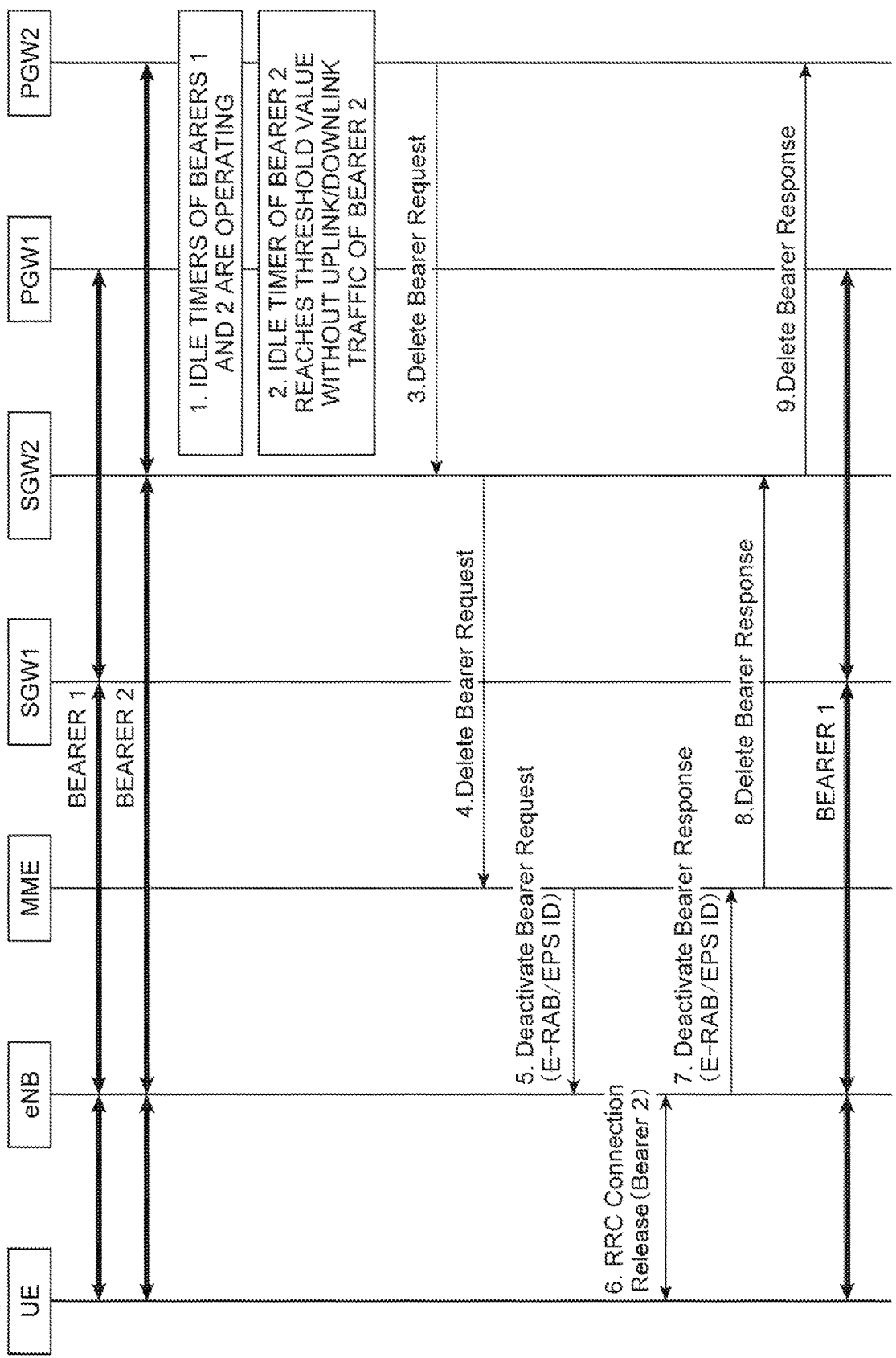
FIG. 5 is a sequence diagram illustrating a bearer releasing process in the first embodiment.

In the first embodiment, a bearer releasing process illustrated in FIG. 5 is performed as a process of releasing one bearer. In the bearer releasing process illustrated in FIG. 5, the idle timer of bearer 1 is operating in the PGW1 and the idle timer of bearer 2 is operating in the PGW2 in a state in which bearers 1 and 2 have been already set up (Step 1 in FIG. 5). That is, an idle time is measured by the measurement unit 21 in each PGW for each bearer. Then, when the idle timer of bearer 2 reaches a threshold value without uplink/downlink traffic in one bearer (for example, bearer 2 herein) (Step 2 in FIG. 5), the determination unit 22 of the PGW2 determines that the idle time of bearer 2 has reached idle timer 2, the request unit 23 of the PGW2 requests release of bearer 2, and the process of releasing bearer 2 is performed as follows.

Here, the PGW2 transmits a Delete Bearer Request to the SGW2 (Step 3 in FIG. 5), and the SGW2 transmits the Delete Bearer Request to the MME (Step 4 in FIG. 5). Then, the MME transmits a Deactivate Bearer Request including an E-RAB/EPS ID to the eNB (Step 5 in FIG. 5), and an RRC Connection Release is performed on bearer 2 between the eNB and the UE having received the request (Step 6 in FIG. 5). Thereafter, the eNB returns a Deactivate Bearer Response including the E-RAB/EPS ID to the MME (Step 7 in FIG. 5), the MME returns a Delete Bearer Response to the SGW2 (Step 8 in FIG. 5), and the SGW2 returns the Delete Bearer Response to the PGW2 (Step 9 in FIG. 5).

Accordingly, as illustrated in FIG. 5, bearer 2 is released, and bearer 1 is not released but left.

At this time, since bearer 1 is not released but left, the UE is kept in a connected state. Accordingly, even in a case in which a terminal simultaneously accesses a plurality of bearers, it is possible to appropriately determine an operation state of each bearer and to appropriately perform control associated with release of each bearer.

Second Embodiment

As described above, in the second embodiment, an embodiment in which control for releasing one bearer of a plurality of bearers is performed dominantly by a PGW in a state in which the plurality of bearers are set up between UE and a single SGW in an EPC network will be described.

(System Configuration of Second Embodiment)

Figure 6:
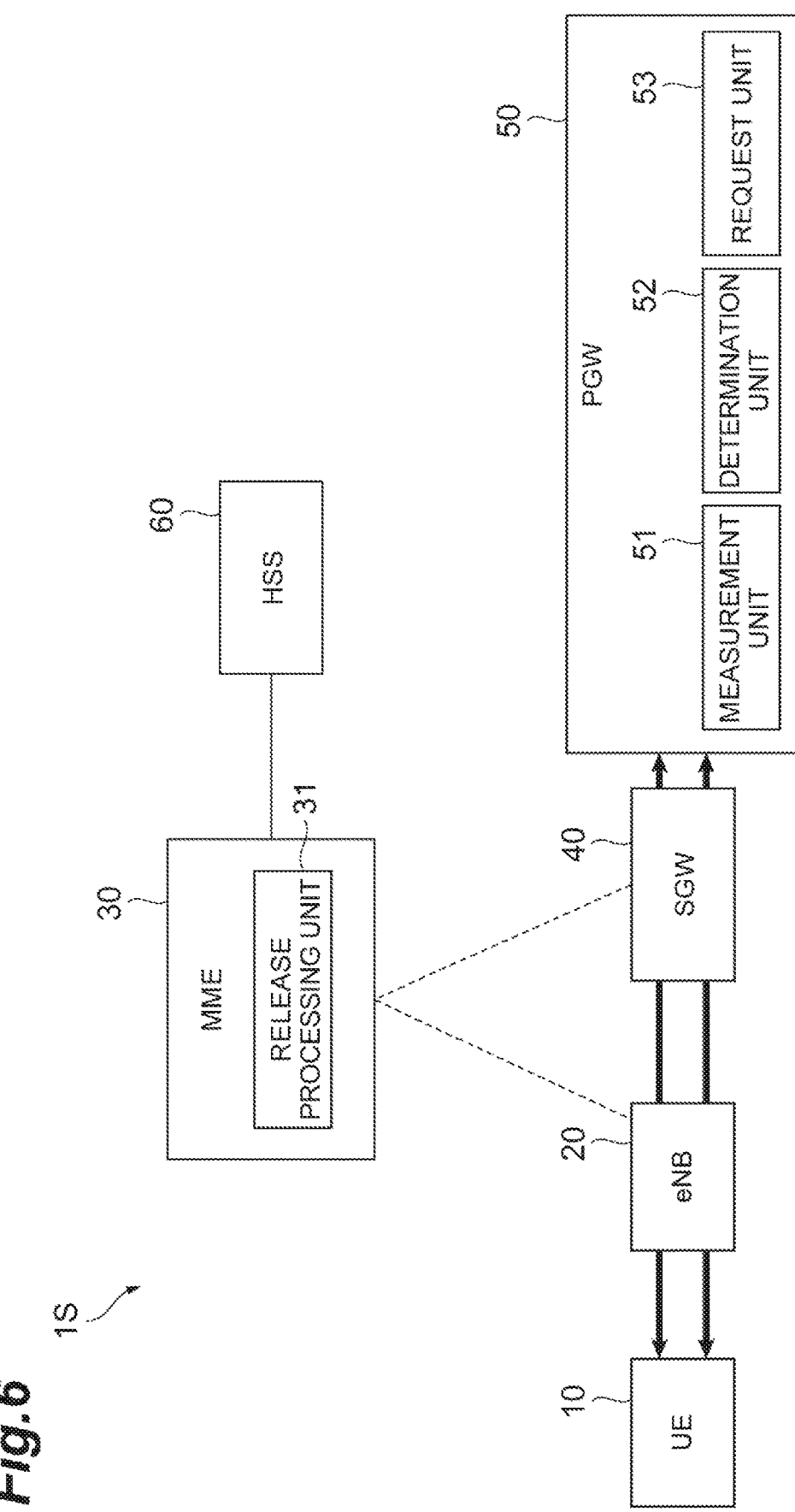
FIG. 6 is a diagram illustrating an example of a configuration of a communication system according to a second embodiment.

As illustrated in FIG. 6, a communication system 1S according to the second embodiment has almost the same configuration as the communication system 1 (FIG. 1) according to the first embodiment, and is different from the communication system 1 (FIG. 1) according to the first embodiment in that a plurality of bearers are set up between UE 10 and a single SGW 40 and reach the single PGW 50.

Figure 3:
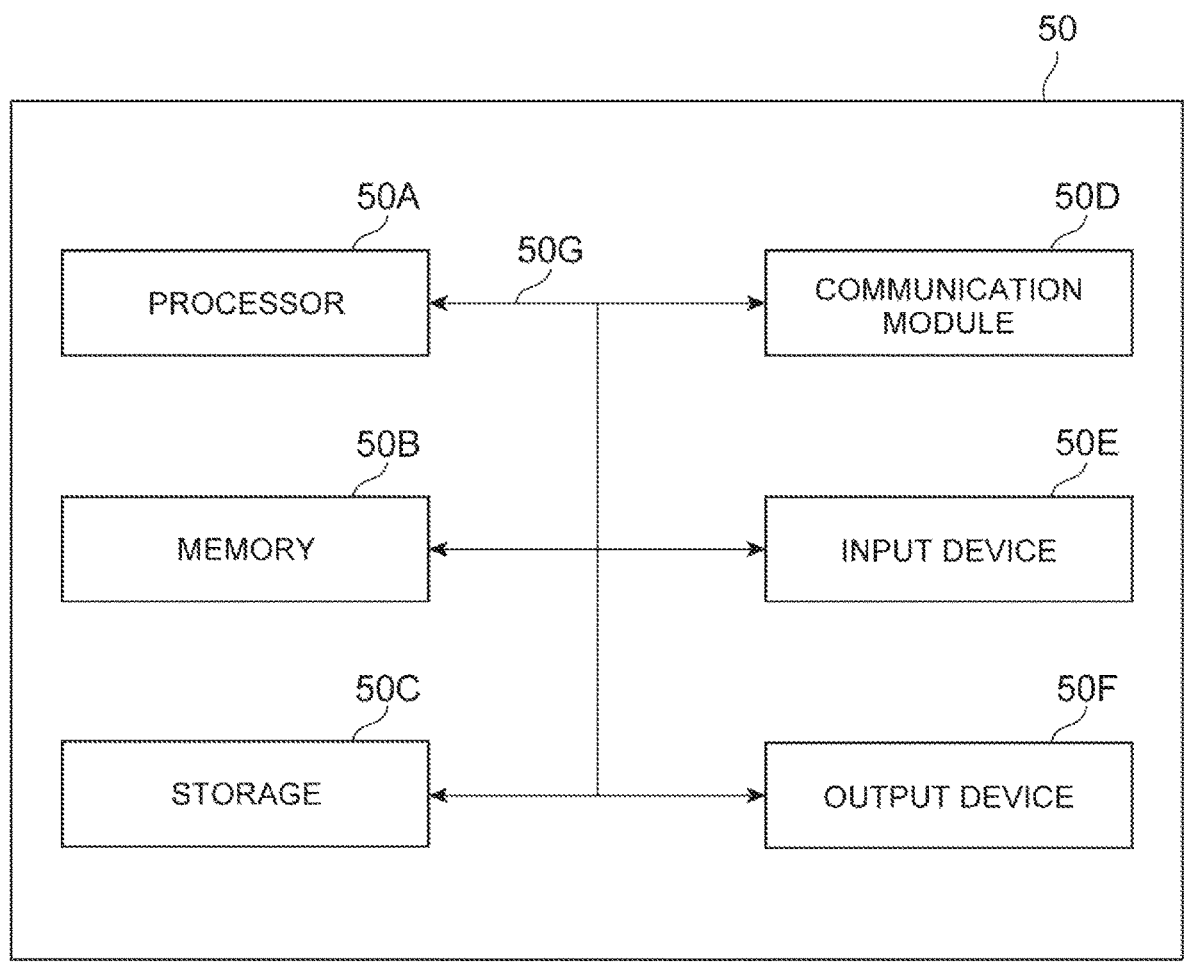
FIG. 3 is a diagram illustrating an example of a hardware configuration of devices.

The functional blocks (the release processing unit 31, the measurement unit 51, and the like) associated with the invention which are included in the PGW 50 and the MME 30, the correspondence tables of idle timers illustrated in FIG. 2(a) and FIG. 2(b), and the examples of the hardware configurations of the devices illustrated in FIG. 3 are the same as those in the first embodiment and thus description thereof will not be repeated.

(Processing Details of Second Embodiment)

Figure 7:
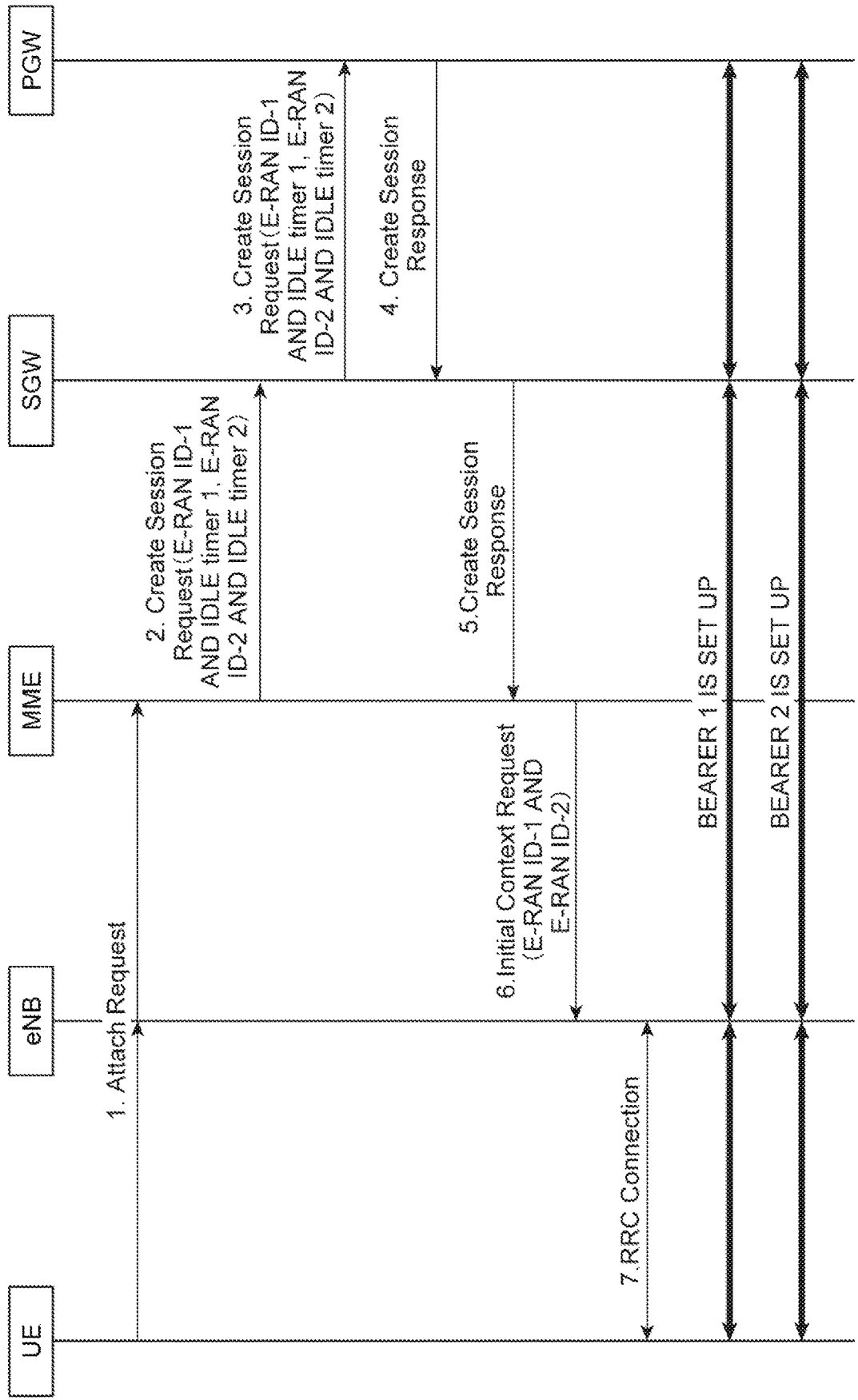
FIG. 7 is a sequence diagram illustrating an attachment process in the second embodiment.

Processing details of the second embodiment will be described below with reference to FIGS. 7 and 8. In an attachment process in the second embodiment illustrated in FIG. 7, when UE transmits an Attach Request for requesting an attachment process associated with a plurality of bearers (bearers 1 and 2 herein) to an eNB, the Attach Request is transmitted from the eNB to an MME (Step 1 in FIG. 7). The MME selects a single SGW and a single PGW depending on a service type which is used by the UE or the like, acquires idle timer information (idle timer 1) when the UE uses a service associated with bearer 1 and idle timer information (idle timer 2) when the UE uses a service associated with bearer 2 from the table of FIG. 2(a) stored in the MME or an SMF which is not illustrated, and transmits a Create Session Request including a combination of E-RAN ID1 and idle timer 1 and a combination of E-RAN ID2 and idle timer 2 to the SGW (Step 2 in FIG. 7). Then, the SGW transmits the Create Session Request including the combination of E-RAN ID1 and idle timer 1 and the combination of E-RAN ID2 and idle timer 2 to the PGW (Step 3 in FIG. 7). Accordingly, the PGW acquires the idle timer information (idle timer 1) associated with bearer 1 and the idle timer information (idle timer 2) associated with bearer 2. Then, the PGW returns a Create Session Response to the SGW (Step 4 in FIG. 7), and the SGW returns the Create Session Response to the MME (Step 5 in FIG. 7). When the MME transmits an Initial Context Request including E-RAN ID1 and E-RAN ID2 to the eNB (Step 6 in FIG. 7), an RRC connection is set up between the UE and the eNB thereafter (Step 7 in FIG. 7) and thus bearer 1 and bearer 2 are set up between the UE and the eNB, between the eNB and the single SGW, and between the single SGW and the single PGW.

As described above, bearers 1 and 2 are set up by performing the bearer setting-up procedure once.

Figure 8:
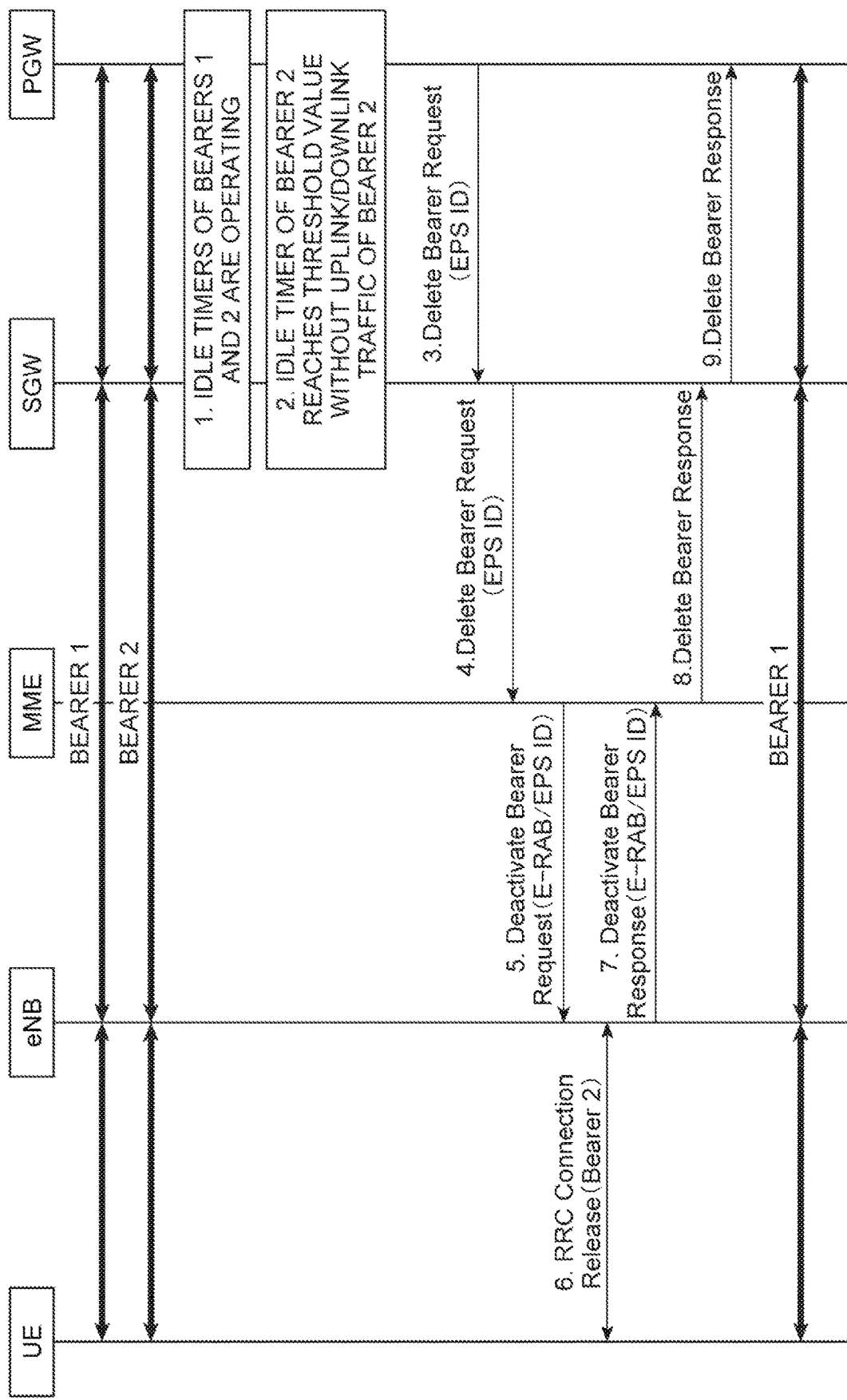
FIG. 8 is a sequence diagram illustrating a bearer releasing process in the second embodiment.

In the second embodiment, a bearer releasing process illustrated in FIG. 8 is performed as a process of releasing one bearer. In the bearer releasing process illustrated in FIG. 8, the idle timer of bearer 1 and the idle timer of bearer 2 are operating in the PGW in a state in which bearers 1 and 2 have been already set up (Step 1 in FIG. 8). That is, an idle time is measured by the measurement unit 51 illustrated in FIG. 1 for each bearer. Then, when the idle timer of bearer 2 reaches a threshold value without uplink/downlink traffic in one bearer (for example, bearer 2 herein) (Step 2 in FIG. 8), the determination unit 52 illustrated in FIG. 1 determines that the idle time of bearer 2 has reached idle timer 2, the request unit 53 illustrated in FIG. 1 requests release of bearer 2, and the process of releasing bearer 2 is performed as follows.

Here, the PGW transmits a Delete Bearer Request including an EPS ID to the SGW (Step 3 in FIG. 8), and the SGW transmits the Delete Bearer Request including an EPS ID to the MME (Step 4 in FIG. 8). Then, the MME transmits a Deactivate Bearer Request including an E-RAB/EPS ID to the eNB (Step 5 in FIG. 8), and an RRC Connection Release is performed on bearer 2 between the eNB and the UE having received the request (Step 6 in FIG. 8). Thereafter, the eNB returns a Deactivate Bearer Response including the E-RAB/EPS ID to the MME (Step 7 in FIG. 8), the MME returns a Delete Bearer Response to the SGW (Step 8 in FIG. 8), and the SGW returns the Delete Bearer Response to the PGW (Step 9 in FIG. 8). As a result, bearer 2 between the UE and the PGW is released as illustrated in FIG. 8.

At this time, since bearer 1 is not released but left, the UE is kept in a connected state. Accordingly, even in a case in which a terminal simultaneously accesses a plurality of bearers, it is possible to appropriately determine an operation state of each bearer and to appropriately perform control associated with release of each bearer.

Third Embodiment

As described above, in the third embodiment, an embodiment in which control for releasing one bearer of a plurality of bearers is performed dominantly by a user plane in a state in which a PDU session is set up between UE and a plurality of user planes in a so-called next generation network will be described.

(System Configuration of Third Embodiment)

Figure 9:
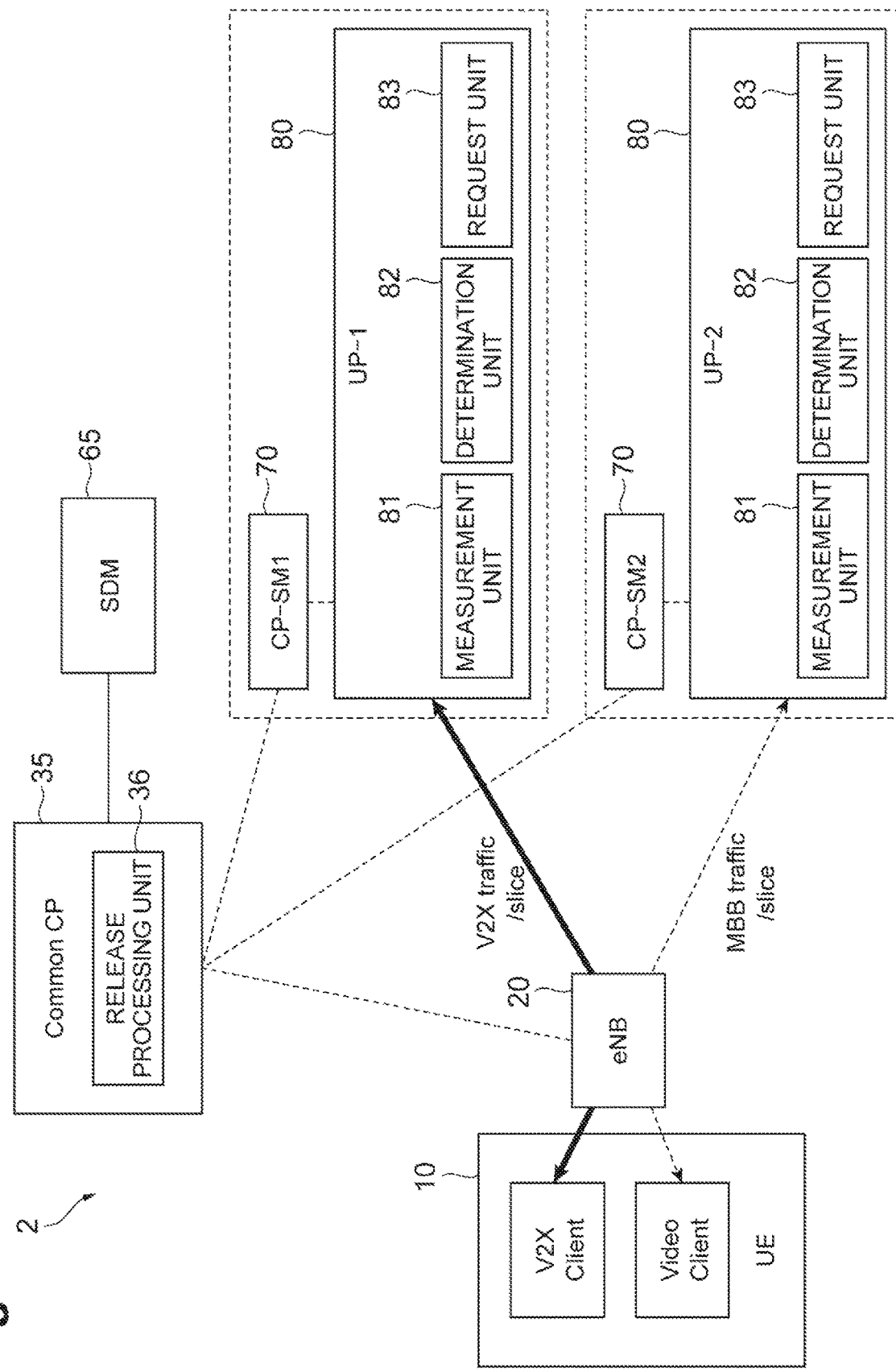
FIG. 9 is a diagram illustrating an example of a configuration of a communication system according to a third embodiment.

As illustrated in FIG. 9, a communication system 2 according to the third embodiment includes a terminal (UE) 10, an eNB 20 corresponding to a base station, a common control plane (hereinafter referred to as a "common CP" in the embodiments of the invention) 35 in a next-generation network, a subscriber data management (SDM) 65 that manages user information (subscriber information) of a terminal user, a control plane-session management (CP-SM) 70 which will be described later, and a user plane (hereinafter referred to as a "UP" in the embodiments of the invention) 80 which will be described later. Here, a "processing server" in the claims corresponds to the common CP 35.

The CP-SM 70 corresponds to a session managing functional unit in a gateway that transmits a control signal for a communication service which is used by the UE 10, and one or more CP-SMs 70 are provided to correspond to requirements of the communication service. Here, for example, CP-SM1 and CP-SM2 are set.

The UP 80 corresponds to a gateway that transmits a user signal for a communication service which is used by the UE 10, and the UP 80 is set to correspond to each CP-SM 70. That is, UP-1 is set to correspond to CP-SM1 and UP-2 is set to correspond to CP-SM2.

In this embodiment, as illustrated in FIG. 9, for example, a vehicle-to-everything (V2X) service and a moving image transmission service are assumed as communication services which are used by the UE 10, and a V2X session is set between the UE 10 and UP-1 for the V2X service and a mobile broadband (MBB) session is set up between the UE 10 and UP-2 for the moving image transmission service, through the procedure illustrated in FIG. 10 which will be described later, The functional blocks (the release processing unit 36, the measurement unit 81, and the like) associated with the invention which are included in the common CP 35 and the UP 80, the correspondence tables of idle timers illustrated in FIG. 2(a) and FIG. 2(c), and the examples of the hardware configurations of the devices illustrated in FIG. 3 are the same as those in the first embodiment and thus description thereof will not be repeated. The correspondence table for idle timers illustrated in FIG. 2(a) is stored by the common idle timer information. The correspondence table for idle timers illustrated in FIG. 2(a) is stored by the common CP 35 corresponding to the MME 30 in FIG. 1. As illustrated in FIG. 2(c), idle timers are stored, for example, in the form of a table in correlation with PDU sessions by the determination unit 82 of the UP 80. The determination unit 82 determines whether or not an idle time measured by the measurement unit 81 has reached an idle timer threshold value using the stored idle timer information for each PDU session.

(Processing Details of Third Embodiment)

Processing details of the third embodiment will be described below with reference to FIGS. 10 and 11. In an attachment process in the third embodiment illustrated in FIG. 10, first, authentication of the UE and selection of a slice are performed between the UE, the eNB, and the common CP (which is abbreviated to "C-CP" in FIGS. 10 and 11) using a convention method (Step 1 in FIG. 10). Here, a V2X slice is selected for the V2X service and an MBB slice is selected for the moving image transmission service.

Figure 10:
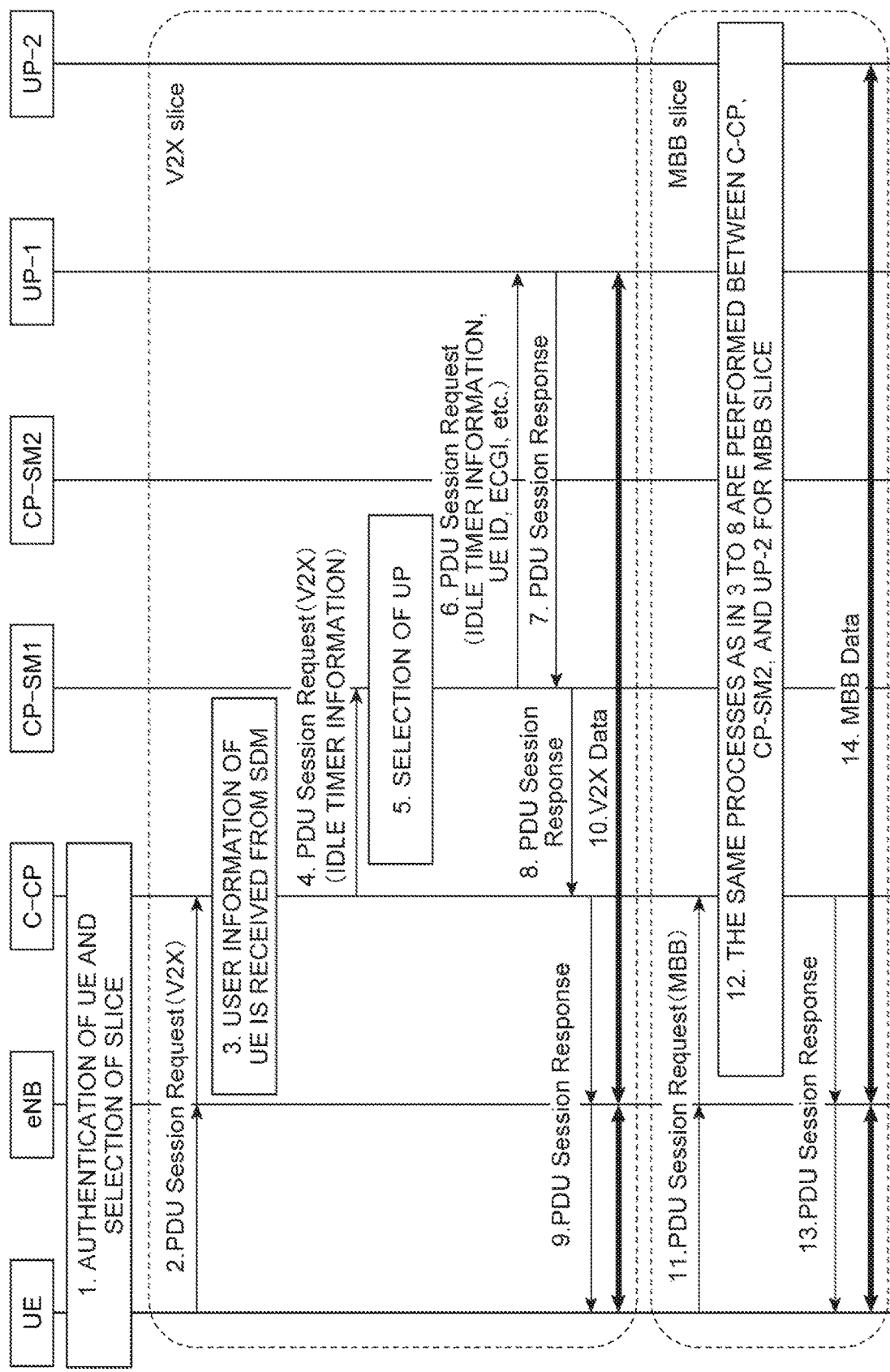
FIG. 10 is a sequence diagram illustrating a PDU session setting-up process in the third embodiment.

Then, when UE transmits a PDU Session Request for the V2X slice to an eNB, the PDU Session Request is transmitted from the eNB to a common CP (Step 2 in FIG. 10). Then, the common CP acquires user information (subscriber information) of the UE such as a UE ID from the SDM (Step 3 in FIG. 10), acquires idle timer information when the UE uses the V2X service from the table of FIG. 2(a) stored in the common CP or an SMF which is not illustrated, and transmits a PDU Session Request including the idle timer information to the CP-SM1 (Step 4 in FIG. 10). Then, the CP-SM1 selects UP-1 as the UP for the V2X slice (Step 5 in FIG. 10) and transmits the PDU Session Request including the idle timer information, the UE-ID, and an E-UTRAN cell global ID (ECGI) to the UP-1 (Step 6 in FIG. 10). Accordingly, the UP-1 having received the PDU Session Request acquires the idle timer information for the V2X slice. Then, the UP-1 returns a PDU Session Response as a positive response to the CP-SM1 (Step 7 in FIG. 10), and the CP-SM1 transmits the PDU Session Response to the common CP (Step 8 in FIG. 10). The common CP transmits the PDU Session Response to the eNB, and the eNB transmits the PDU Session Response to the UE (Step 9 in FIG. 10). In this way, a PDU session for the V2X slice (hereinafter referred to as a "V2X PDU session") is set up between the UE and the eNB and between the eNB and the UP-1 (Step 10 in FIG. 10).

As for a PDU session for the MBB slice (hereinafter referred to as an "MBB PDU session"), almost similarly, when the UE transmits a PDU Session Request for the MBB slice to the eNB, the PDU Session Request is transmitted from the eNB to the common CP (Step 11 in FIG. 10). Thereafter, the same processes as Steps 3 to 8 are performed between the common CP, CP-SM2, and UP-2 for the MBB slice (Step S12 in FIG. 10), and the UP-2 acquires idle timer information for the MBB slice in the course. The common CP transmits a PDU Session Response to the eNB, and the eNB transmits the PDU Session Response to the UE (Step 13 in FIG. 10). In this way, an MBB PDU session is set up between the UE and the eNB and between the eNB and the UP-2 (Step 14 in FIG. 10).

As described above, the V2X PDU session and the MBB PDU session are set up by repeating almost the same PDU session setting-up procedure two times.

Figure 11:
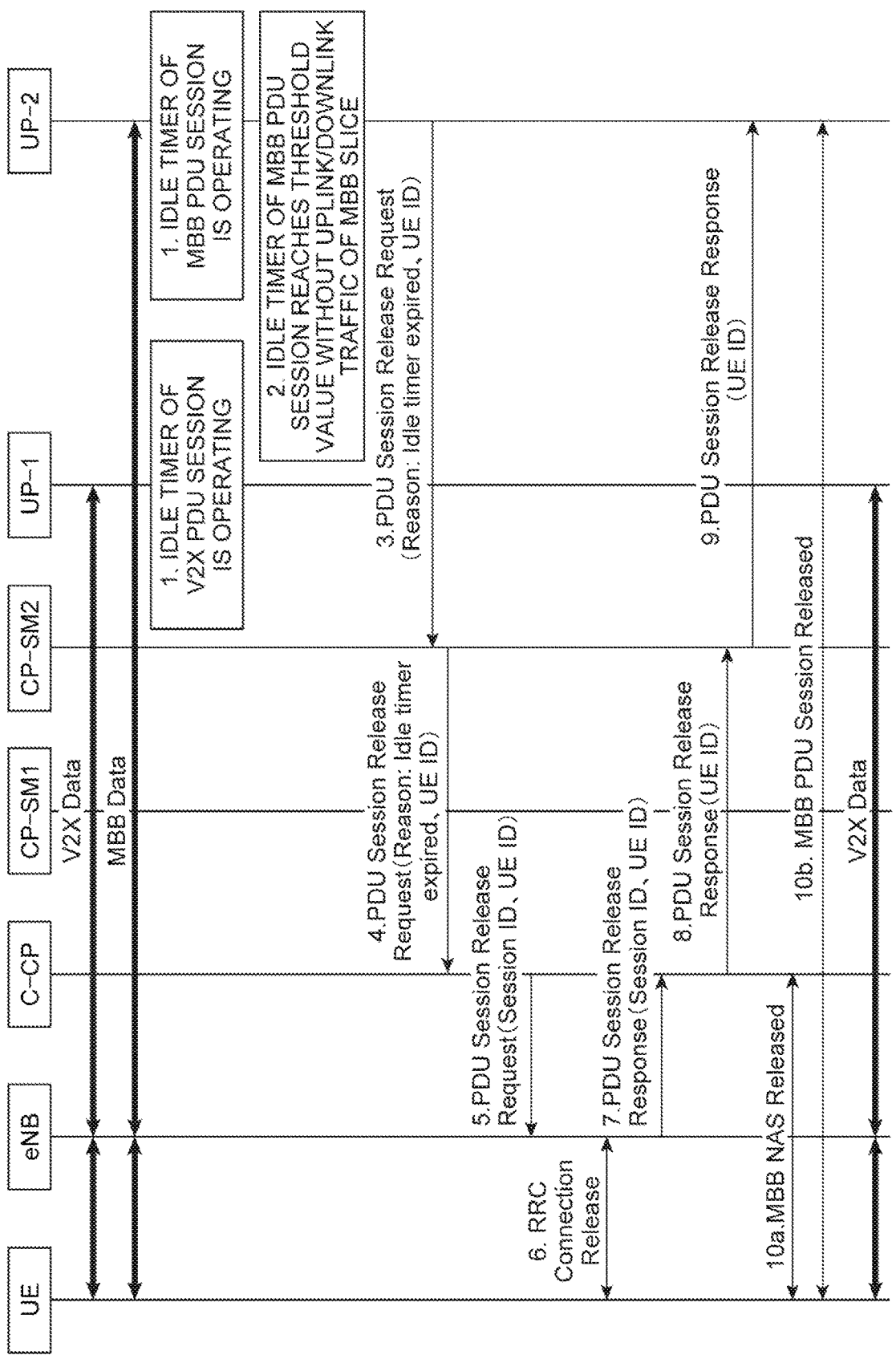
FIG. 11 is a sequence diagram illustrating an MBB slice releasing process in the third embodiment.

In the third embodiment, a procedure illustrated in FIG. 11 is performed as a process of releasing one PDU session. In the procedure illustrated in FIG. 11, the idle timer of the V2X PDU session is operating in the UP-1 and the idle timer of the MBB PDU session is operating in the UP-2 in a state in which the V2X PDU session and the MBB PDU session have been already set up (Step 1 in FIG. 11). That is, an idle time is measured by the measurement unit 81 illustrated in FIG. 9 for each PDU session. Then, when the idle timer of the PDU session reaches a threshold value (idle timer 2) without uplink/downlink traffic in one PDU session (for example, the MBB PDU session herein) (Step 2 in FIG. 11), the determination unit 82 of the UP-2 determines that the idle time of the MBB PDU session has reached idle timer 2, the request unit 83 of the UP-2 requests release of the MBB PDU session, and the process of releasing the MBB PDU session is performed as follows.

The request unit 83 of the UP-2 transmits a PDU Session Release Request including the reason why the idle timer of the MBB PDU session has reached the threshold value and the UE-ID to the CP-SM2 (Step 3 in FIG. 11), and the CP-SM2 transmits the PDU Session Release Request to the common CP (Step 4 in FIG. 11). Then, the common CP transmits the PDU Session Release Request including a session ID of the MBB PDU session and the UE-ID to the eNB (Step 5 in FIG. 11), and an RRC connection release is performed on the MBB PDU session between the eNB and the UE (Step 6 in FIG. 11). Thereafter, the eNB transmits a PDU Session Release Response including the session ID of the MBB PDU session and the UE-ID as a positive response to the common CP (Step 7 in FIG. 11), the common CP transmits the PDU Session Release Response including the UE-ID to the CP-SM2 corresponding to the session ID included in the PDU Session Release Response (Step 8 in FIG. 11), and the CP-SM2 transmits the PDU Session Release Response including the UE-ID to the UP-2 (Step 9 in FIG. 11). The MBB network attached storage (NAS) between the common CP and the UE is released (Step 10a in FIG. 11), the UP2 releases UE context associated with the UE corresponding to the UE ID included in the received PDU Session Release Response, and the MBB PDU session between the UE and the UP-2 is released (Step 10b in FIG. 11). As a result, as illustrated in FIG. 11, the MBB PDU session between the UE and the UP-2 is released. At this time, since the V2X PDU session is not released but left, the UE is kept in a connected state. Accordingly, even in a case in which a terminal simultaneously accesses a plurality of PDU sessions, it is possible to appropriately determine an operation state of each PDU session and to appropriately perform control associated with release of each PDU session.

According to the first to third embodiments, even in a case in which a terminal simultaneously accesses a plurality of bearers or PDU sessions, it is possible to appropriately determine an operation state of each bearer or each PDU session and to appropriately perform control associated with release of each bearer or PDU session.

By causing a PGW (or a UP) which is located upstream in a network to perform measurement of an idle time, determination of whether or not the idle time has reached an idle timer threshold value, and a request for releasing one bearer (or one PDU session) when it is determined that the idle time for the one bearer (or the one PDU session) has reached the idle timer threshold value, there is an advantage that it is not necessary to change specifications of a radio access network (RAN).

The idle timer threshold value for determining an idle state is used in monitoring an idle time for determining the operation state of each bearer or each PDU session, the idle timer threshold values are stored in correlation with the bearers by the PGW as illustrated in FIG. 2(b) and are stored in correlation with the PDU sessions by the user plane (UP) as illustrated in FIG. 2(c). By causing the PGW or the user plane (UP) to manage the idle timer threshold values in this way, it is possible to appropriately monitor an idle time when a new bearer or PDU session is set up or the like and to appropriately determine an operation state of each bearer or each PDU session.

The HSS 60 illustrated in FIGS. 1 and 6 and the SDM 65 illustrated in FIG. 9 are not essential elements for control associated with release of a bearer or a PDU session according to the invention, and the HSS 60 and the SDM 65 may be omitted in a configuration as long as the configuration can notify the PGW (or the user plane) of an appropriate idle timer threshold value for each bearer (or each PDU session).

While the embodiments of the invention have been described above in detail, it is apparent to those skilled in the art that the invention is not limited to the embodiments described in this patent specification. The invention can be modified and altered in various forms without departing from the gist and scope of the invention defined by description in the appended claims. Accordingly, description in this patent specification is for exemplary explanation, and does not have any restrictive meaning for the invention.

Transmission of information is not limited to the aspects/embodiments described in this patent specification, but may be performed using other methods. For example, the transmission of information may be performed by physical layer signaling (such as downlink control information (DCI) or uplink control information (UCI)), upper layer signaling (such as radio resource control (RRC) signaling, medium access control (MAC) signaling, or notification information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this patent specification may be applied to systems employing Long Term Evolution (LTE), LTE-Advanced (LIE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this patent specification may be changed as long as it does not cause any inconsistencies. For example, in the methods described in this patent specification, various steps are described as elements in an exemplary order but the methods are not limited to the described order.

Information or the like can be output from an upper layer (or a lower layer) to a lower layer (or an upper layer). The information or the like may be input or output via a plurality of network nodes.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this patent specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

Regardless of whether it is called software, firmware, middleware, microcode, hardware description language, or another name, software can be widely interpreted to refer to commands, a command set, codes, code segments, program codes, a program, a sub program, a software module, an application, a software application, a software package, a routine, a sub routine, an object, an executable file, an execution thread, an order, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in this patent specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in this patent specification and/or the terms required for understanding this patent specification may be substituted by terms having the same or similar meanings.

The term, "system" and "network" are used synonymously in this patent specification.

Information, parameters, and the like described in this patent specification may be expressed by absolute values, may be expressed by values relative to a predetermined value, or may be expressed by other corresponding information. For example, radio resources may be indicated by indices.

Names which are used for the above-mentioned parameters are not restrictive in any viewpoint. Expressions or the like using the parameters may be different from the expressions which are explicitly disclosed in this patent specification. Since various channels (for example, a PUCCH and a PDCCH) and information elements (for example, a TPC) can be distinguished by all appropriate names, various names given to various channels and information elements are not restrictive in any viewpoint.

A base station (eNB) in this embodiment can cover one or more cells (which are also referred to as sectors). When a base station covers two or more cells, the entire coverage area of the base station can be partitioned into a plurality of smaller sub areas, and each sub area may provide a communication service by a base station subsystem (for example, an indoor small base station RRH (Remote Radio Head)). The term "cell" or "sector" refers to a partial or whole coverage area of a base station and/or a base station subsystem that provides a communication service in the coverage. The terms "base station," "eNB," "cell," and "sector" can be compatibly used in this patent specification. The base station may also be referred to as a fixed station, a NodeB, an access point, a femtocell, a small cell, or the like.

A terminal (UE) may also be referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or several appropriate terms by those skilled in the art.

The term "determining" or "determination" which is used in this patent specification may include various types of operations. The term "determining" or "determination" may include, for example, cases in which judging, calculating, computing, processing, deriving, investigating, looking up (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined."

The expression "on the basis of" as used in this patent specification does not mean "on the basis of only" unless otherwise described. In other words, the expression "on the basis of" means both "on the basis of only" and "on the basis of at least."

Any reference to elements having names such as "first" and "second" which are used in this patent specification does not generally limit amounts or an order of the elements. The terms can be conveniently used to distinguish two or more elements in this patent specification. Accordingly, reference to first and second elements does not mean that only two elements are employed or that the first element has to precede the second element in any form.

When the terms "include," "comprising," and modifications thereof are used in this patent specification or the appended claims, the terms are intended to have a comprehensive meaning similar to the term "comprising." The term "or" which is used in this patent specification or the claims is not intended to mean an exclusive logical sum.

In this patent specification, a singular term includes plural forms unless only one is mentioned to be apparent in context or technically.

REFERENCE SIGNS LIST 1, 1S, 2 ... Communication system, 10 ... UE (terminal), 20 ... eNB (base station), 30 ... MME (processing server), 31 ... Release processing unit, 35 ... Common CP (processing server), 36 ... Release processing unit, 40 ... SGW, 50 ... PGW, 50A ... Processor, 50B ... Memory, 50C ... Storage, 50D ... Communication module, 50E ... Input device, 50F ... Output device, 50G ... Bus, 51 ... Measurement unit, 52 ... Determination unit, 53 ... Request unit, 60 ... HSS, 65 ... SDM, 70 ... CP-SM (control plane), 80 ... UP (user plane), 81 ... Measurement unit, 82 ... Determination unit, 83 ... Request unit.

The invention claimed is:

1. A communication control method which is performed in a communication system which includes a terminal, a base station, a processing server that performs a process associated with the terminal, one or more serving gateways, and one or more packet data network gateways and in which a plurality of bearers are set up between the terminal and the one or more packet data network gateways via the base station and the one or more serving gateways, the communication control method comprising:
a step of causing the packet data network gateway to measure an idle time which is a duration time of an idle state of a bearer for each bearer;
a step of causing the packet data network gateway to determine whether or not the measured idle time has reached an idle timer threshold value which is determined in advance for each of the plurality of bearers as an idle timer threshold value that is used to determine that a bearer is in an idle state for each bearer;
a step of causing the packet data network gateway to request the processing server to release one bearer when it is determined that the idle time for the bearer has reached the idle timer threshold value; and
a step of causing the processing server to perform a process of releasing the bearer in response to the request from the packet data network gateway,
wherein the idle timer threshold values are stored in correlation with the bearers by the packet data network gateway.

2. A communication control method which is performed in a communication system which includes a terminal, a base station, a processing server that performs a process associated with the terminal, a plurality of control planes that transmit a control signal for a communication service which is used by the terminal, and a plurality of user planes that transmit a user signal for the communication service and in which a PDU session is set up between the terminal and the plurality of user planes via the base station, the communication control method comprising:
a step of causing each user plane to measure an idle time which is a duration time of an idle state of a PDU session set in the user plane;
a step of causing each user plane to determine whether or not the measured idle time has reached an idle timer threshold value which is determined in advance to determine that a PDU session set in the user plane is in an idle state;
a step of causing one user plane to request the processing server to release a PDU session set in the one user plane when the one user plane determines that the idle time has reached the idle timer threshold value; and
a step of causing the processing server to perform a process of releasing the PDU session set in the one user plane in response to the request from the one user plane,
wherein the idle timer threshold values are stored in correlation with the PDU sessions by the user plane.

3. A communication system comprising a terminal, a base station, a processing server that performs a process associated with the terminal, one or more serving gateways, and one or more packet data network gateways and in which a plurality of bearers are set up between the terminal and the one or more packet data network gateways via the base station and the one or more serving gateways,
wherein the packet data network gateway includes:
a circuitry configured to:
measure an idle time which is a duration time of an idle state of a bearer for each bearer;
determine whether or not the measured idle time has reached an idle timer threshold value which is determined in advance for each of the plurality of bearers as an idle timer threshold value that is used to determine that a bearer is in an idle state for each bearer; and
request the processing server to release one bearer when it is determined that the idle time for the bearer has reached the idle timer threshold value, and
wherein the processing server includes:
a circuitry configured to perform a process of releasing the bearer in response to the request from the packet data network gateway,
wherein the idle timer threshold values are stored in correlation with the bearers by the packet data network gateway.

4. A communication system comprising a terminal, a base station, a processing server that performs a process associated with the terminal, a plurality of control planes that transmit a control signal for a communication service which is used by the terminal, and a plurality of user planes that transmit a user signal for the communication service and in which a PDU session is set up between the terminal and the plurality of user planes via the base station,
wherein each user plane includes:
a circuitry configured to:
measure an idle time which is a duration time of an idle state of a PDU session set in the user plane;
determine whether or not the measured idle time has reached an idle timer threshold value which is determined in advance to determine that a PDU session set in the user plane is in an idle state; and
request the processing server to release a PDU session set in the one user plane when it is determined that the idle time has reached the idle timer threshold value, and
wherein the processing server includes:
a circuitry configured to perform a process of releasing the PDU session set in the one user plane in response to the request from the one user plane,
wherein the idle timer threshold values are stored in correlation with the PDU sessions by the user plane.

* * * * *